Dec. 9, 1958  G. W. KELLY  2,863,226
QUIZ DEVICE WITH CORRECT ANSWER INDICATING MEANS
Filed Sept. 29, 1954  2 Sheets-Sheet 1
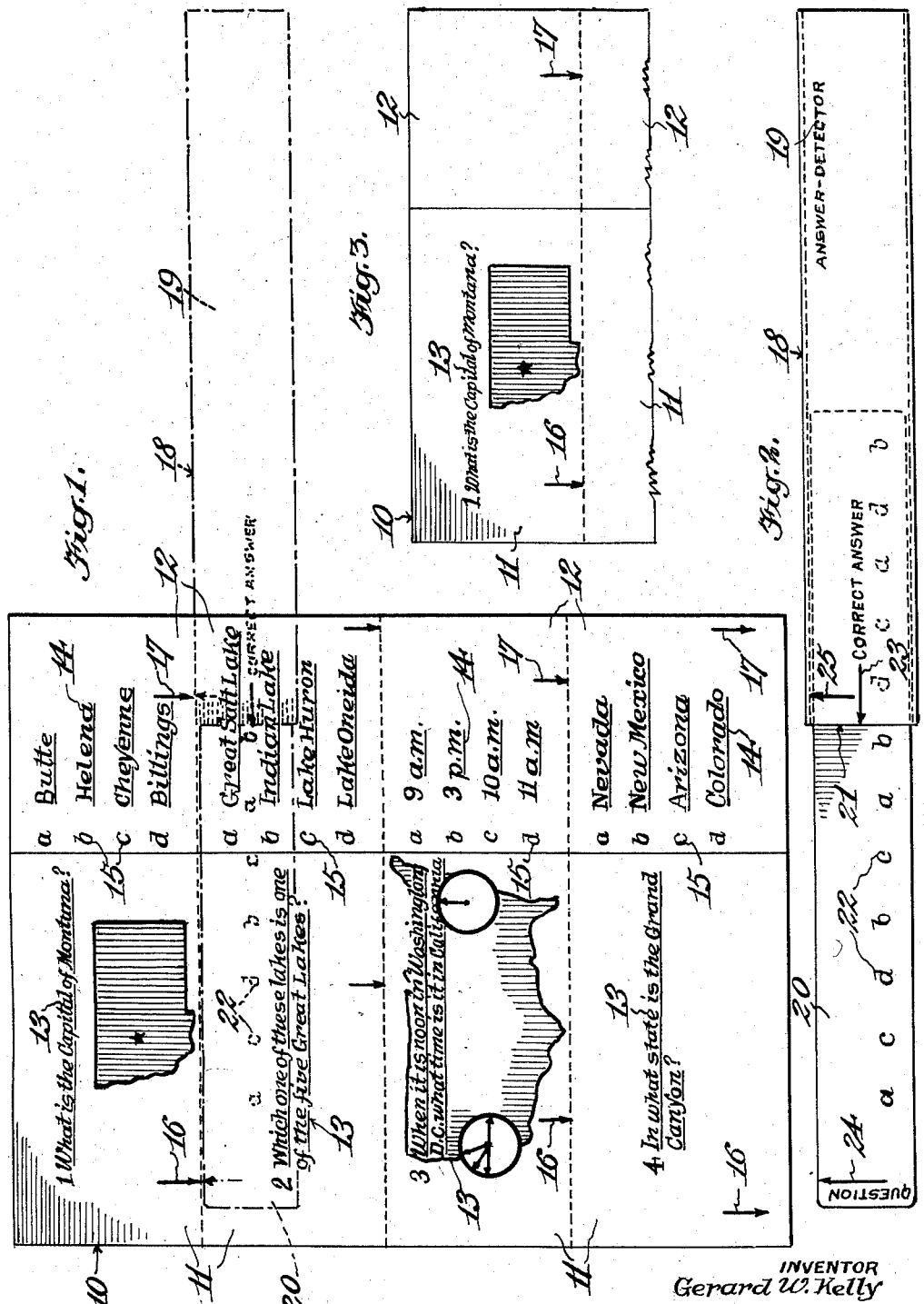
INVENTOR
Gerard W. Kelly
By Munn, Liddy, Nathanson & March
ATTORNEYS Dec. 9, 1958   G. W. KELLY   2,863,226
QUIZ DEVICE WITH CORRECT ANSWER INDICATING MEANS
Filed Sept. 29, 1954   2 Sheets-Sheet 2
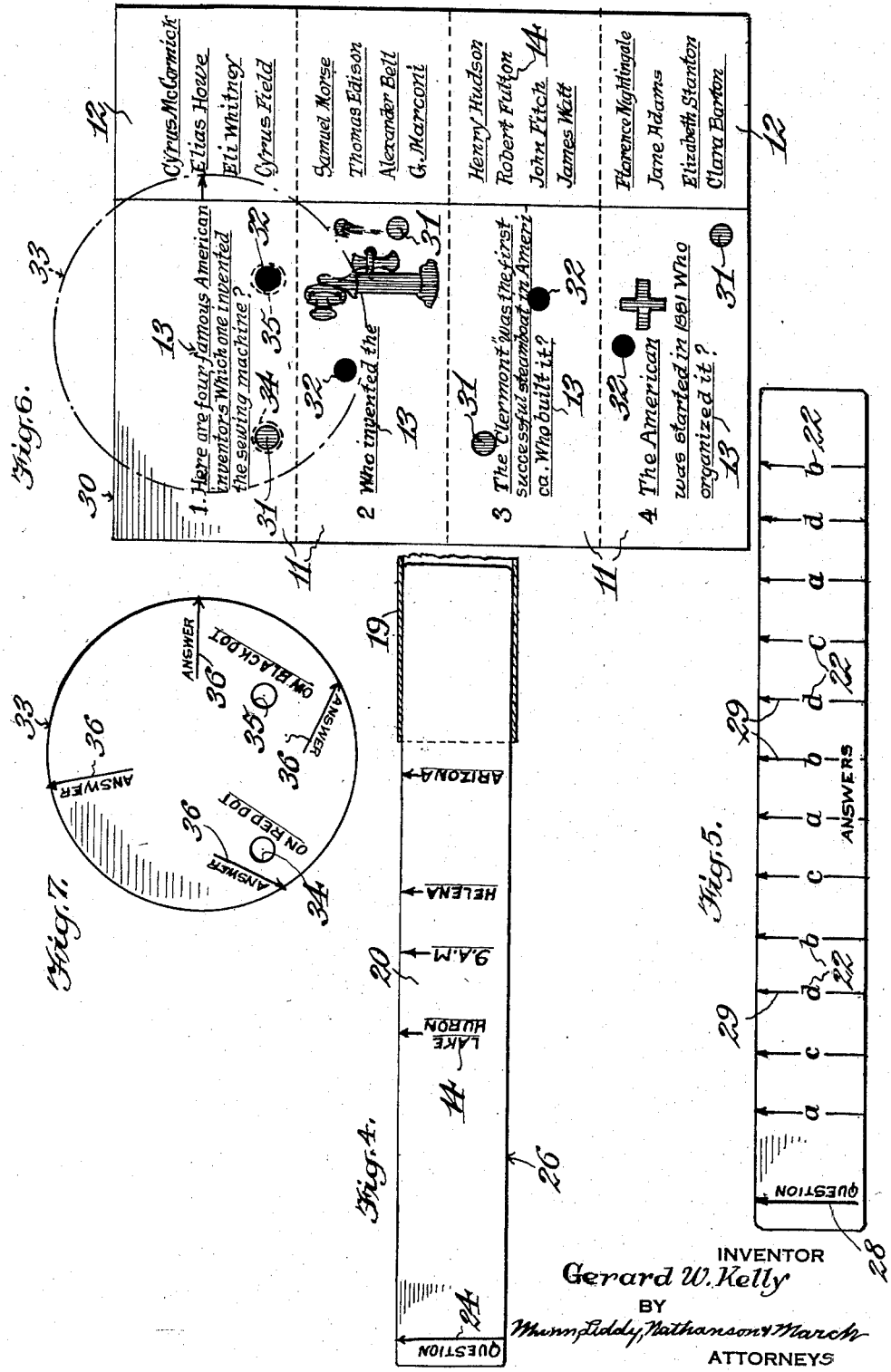
INVENTOR
Gerard W. Kelly

United States Patent Office

2,863,226
Patented Dec. 9, 1958

2,863,226

QUIZ DEVICE WITH CORRECT ANSWER INDICATING MEANS

Gerard Walter Kelly, East Orange, N. J.

Application September 29, 1954, Serial No. 459,117

3 Claims. (Cl. 35—9)

This invention relates to the class of educational devices, and has especial reference to a quiz or question and answer device.

The principal object of the present invention is the provision of a quiz device comprising a chart and a separate manipulative element adapted for cooperative use with the chart by school boys and girl and others for the purpose of testing and indicating the users correctness or incorrectness in answering questions regarding various subjects of an educational character.

With the foregoing, other objects and benefits of the present invention, as exemplified by the disclosed embodiments thereof, will appear when the following description is read in conjunction with the accompanying drawings, in which Fig. 1 is a plan view of a question and answer chart of the quiz device, the answer detector element of the device being shown in dotted lines upon the chart.

Fig. 2 is a side view of the answer detector element appearing in Fig. 1.

Fig. 3 is a fragmentary plan view of a modified form of the chart.

Fig. 4 is a side view of a modified form of answer detector element useful with the chart shown in Fig. 3.

Fig. 5 is a side view of a still further modified form of answer detector element useful with the chart shown in Fig. 1.

Fig. 6 is a plan view of another modified form of answer and question chart, the answer detector element for this chart being shown in dotted lines upon the chart.

Fig. 7 is a side view of the answer detector element useful with the chart shown in Fig. 6.

In Fig. 1 of the drawings, the question and answer chart 10, by way of example, consists of a rectangular sheet or plate of stiff paper, cardboard or the like. The top face of the chart is subdivided by intersecting lines into a plurality of question zones 11 and a plurality of correlated answer zones 12. Within each zone 11 is printed or inscribed intelligence matter which formulates a certain numbered question, and in general, said matter formulating each question is designated 13. Within each zone 12 is printed or inscribed matter 14 denoting different answers among which is the correct answer to the question in the correlated zone 10. Each answer is identified by a particular symbol 15, such as the letter of the alphabet shown. The question number 1 as illustrated is, "What is the capital of Montana?" The State of Montana is shown in outline, and a star is shown within said outline to give a hint to the user as to the correct answer. The matter 14 applicable to the question number 1 embraces the names Butte, Helena, Cheyene, and Billings identified by the symbols *a*, *b*, *c* and *d* respectively. The other question and answer couplets numbers 2, 3 and 4 shown in Fig. 1 are self-explanatory.

Each question and answer couplet contains a pair of relatively spaced marks, such as distinctive arrows 16 and 17, the arrow 16 being blue and the arrow 17 being red in color in the present instance.

As a part of the quiz device, use is made of a manipulative answer detector element 18 shown in Fig. 2 and appearing in Fig. 1 in dotted lines. The element 18 comprises a sheath 19 and a strip member 20 which are made of stiff paper, cardboard or other suitable material. One end edge 21 of the sheath 19 serves as a telltale. The strip member 20 has guided sliding movement inwardly and outwardly in the sheath 19 into different positions of adjustment. On the top face of the strip member 20 are printed or inscribed a row of symbols 22 such as letters of the alphabet and corresponding to the symbols 15. The symbols 22 are arranged in spaced relation to each other along the strip member 20 so as to be severally brought nearest to the edge 21 exteriorly of the sheath 19 by adjusting the strip member. The sheath 19 has printed thereon a pointer 23 in line with the row of symbols 22. The pointer 23 is at the edge 21 and has the legend "Correct Answer" associated therewith.

Printed or inscribed on the sheath 19 and the strip member 20 respectively are marks, such as distinctive arrows 24 and 25. The arrow 24 is blue in contrast to the color of the arrow 25 which is red to match the arrows 16 and 17 respectively. Also the arrows 24 and 25 are arranged to be brought into registry with the arrows 16 and 17 respectively by manipulating the sheath 19 and strip member 20 with respect to each other.

In the use of the device is described hereinabove the user selects a question from those appearing on the chart 10. Question number 1 for instance—"What is the capital of Montana." To ascertain if the user knows the correct answer use is made of the answer detector element 18. This is done by slidably adjusting the strip member 20 with respect to the sheath 19 while the element 18 is laid upon the chart 10 to bring the arrows 24 and 25 into registry with the arrows 16 and 17 respectively. This will bring the symbol *b* of the strip member 20 nearest the edge 21 and adjacent the pointer 23. On reference to the names 14 it will be apparent that the symbol *b* is adjacent the name "Helena" the capital of Montana and the correct answer to the proposed question.

As shown in Fig. 3 the names 14 setting forth the various answers including the correct answer may be omitted. In that case use is made of an answer detector element 26 as shown in Fig. 4 wherein the names 14 are printed or inscribed on the strip member 20 in lieu of the symbols 22. In other respects the element 26 is similar to the element 18 and is used like the element 18. The user may write the answer in the particular zone 12 or make a mental note of what he or she thinks is the correct answer.

In Fig. 5 there is shown a further modified form of answer detector element 27 consisting of a strip of cardboard or the like. On one face of the element 27 are printed or inscribed the series of symbols 22, a blue arrow 28 at one end of the element 27 and a red arrow 29 associated with each of the symbols 22 as shown. By placing the element 27 on the chart 10 at the selected question and answer couplet, the correct answer will be determined and visually indicated by that particular arrow 29 in registry with the particular red arrow 17 on the chart 10. If question number 1 has been selected and the above described operation has been performed the red arrow 29 associated with the symbol *b* of the series 15 will indicate the correct answer to the proposed question is "Helena" designated by said symbol *b*.

In Fig. 6 there is shown a modified form of chart 30 similar to the chart 10 regarding the format, the only differences being in the omission of the series of symbols 15, and in the use of dots 31 and 32 in lieu of the arrows 16 and 17. In Fig. 6 reference numerals similar to those in Fig. 1 are applied to corresponding features.

In Fig. 7 there is shown a modified answer detector element 33 to be used with the chart 30 shown in Fig. 6. The element 33 consists of a disk of stiff paper, cardboard or the like. The element 33 has holes 34 and 35 therein to match the dots 31 and 32 as to size and spacing. The hole 34 is identified by the legend On Red Dot and the hole 35 is identified by the legend On Black Dot. At properly spaced points on the element 33 are printed or inscribed arrows 36 associated with the word Answer.

In the use of the modified quiz device of Figs. 6 and 7, the user selects a question appearing on the chart 30. Question number 1 for instance, "Here Are Four Famous American Inventors, Which One Invented The Sewing Machine?". The user for his or her answer checks one of the names in the particular zone 12 and places the element 33 within the correlated zone 11 of the chart 30. Then the holes 34 and 35 must be brought into registry with the dots 31 and 32 respectively thereby matching the same. When that has been done one of the arrows 36 points to the name "Elias Howe" which indicates the correct answer and so instructs the user accordingly as to the correctness or incorrectness of his or her answer.

It is to be understood that the invention is not restricted to the details and arrangement above described, but includes all modifications coming within the scope of the appended claims.

I claim:

1. A quiz device comprising a chart having intelligence matter thereon formulating questions, an answer detector element comprising a separate instrumentality, and cooperative means on said chart and said element for determining and visually indicating the correct answer to each question, said cooperative means comprising: spaced similar, symbolic indicia on said chart having a predetermined and fixed spaced relation to each other, said indicia being located without respect to the locations of said intelligence matter, a larger plurality of spaced similar, symbolic indicia on the answer element, at least two of said larger plurality being capable of matching with said spaced indicia of the chart when the answer element is brought into juxtaposition with the chart, and markings on said answer element, associated with the said larger plurality of indicia thereof, for designating a plurality of different possible answers to the said intelligence matter.

2. A quiz device as set forth in claim 1, wherein said cooperative means further comprises different answers including the correct answer to each of said questions, said spaced indicia on said chart and said answer detector element being so arranged that when they are brought into registry the correct answer to each correlated question will be visually indicated.

3. A quiz device comprising a chart having intelligence matter thereon formulating questions and different answers to each of the respective questions and including the correct answer to each of the respective questions, an answer detector element comprising a separate instrumentality, each of said answers being identified by a distinctive symbol on the chart, one of which is for a correct answer, said answer detector element having symbols thereon similar to the symbols on said chart, and cooperative means on said chart and said answer detector element for determining and visually indicating the correct answer to each of said questions by virtue of said symbols, said answer detector element comprising two members telescoping one within the other, said cooperating means being on both of said members, the symbols of said answer detector element being on one of said telescopic members.

References Cited in the file of this patent

UNITED STATES PATENTS

| | | |
|---|---|---|
| 1,305,562 | Paulsen | June 3, 1919 |
| 1,436,997 | McDade | Nov. 28, 1922 |
| 1,448,827 | Burnett | Mar. 20, 1923 |
| 1,915,653 | Dutton | June 27, 1933 |
| 2,459,231 | Lorber | Jan. 18, 1949 |
| 2,497,200 | Appel | Feb. 14, 1950 |